June 2, 1964   J. THEVENAZ   3,135,156
PROJECTOR WITH UNITARY MOUNTING PLATE ASSEMBLY
Filed Feb. 23, 1961   3 Sheets-Sheet 1

INVENTOR
JEAN THEVENAZ
By Emery L. Groff
Atty

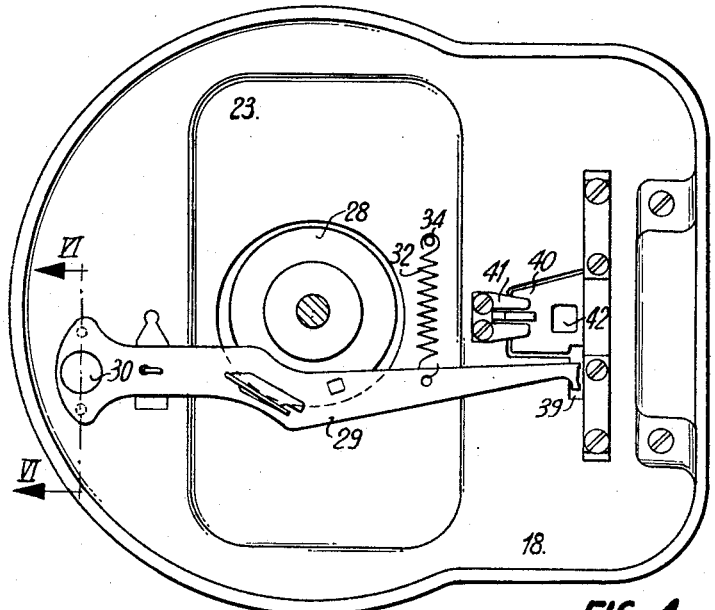
FIG. 4
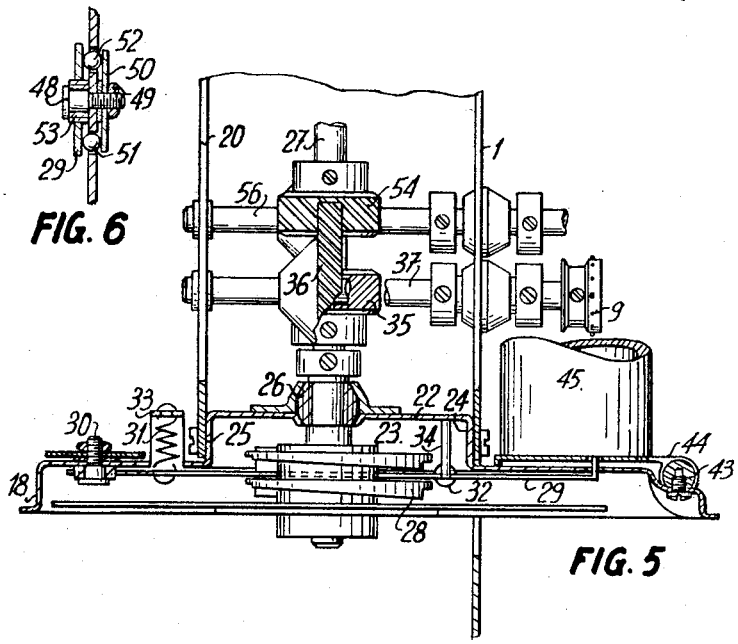
FIG. 6
FIG. 5

June 2, 1964   J. THEVENAZ   3,135,156
PROJECTOR WITH UNITARY MOUNTING PLATE ASSEMBLY
Filed Feb. 23, 1961   3 Sheets-Sheet 3

INVENTOR
JEAN THEVENAZ
By Emory L. Groff Jr.
Atty

United States Patent Office 3,135,156
Patented June 2, 1964

3,135,156
PROJECTOR WITH UNITARY MOUNTING
PLATE ASSEMBLY
Jean Thevenaz, Grandson, Switzerland, assignor to
Paillard S.A., Sainte-Croix, Vaud, Switzerland, a
corporation of Switzerland
Filed Feb. 23, 1961, Ser. No. 91,212
Claims priority, application Switzerland Mar. 1, 1960
1 Claim. (Cl. 88—17)

Cinematographic projectors are known which comprise among others an objective lens, means for guiding the film in front of a film gate, a claw for feeding the film, a shaft longitudinally arranged relatively to the projection axis and carrying a control cam for the claw, these projectors being constituted by assembled sheet-metal elements including a transverse plate.

The present invention has for an object the provision of a projector of this kind, the construction of which is greatly simplified by the fact that the transverse plate alone carries the objective lens, the film guiding means, a hinge for the film feeding claw and a bearing for the shaft having the cam. In this way, all the elements, the mounting of which must be effected in a very accurate manner, are disposed on one and the same plate. They may thus be placed the one relatively to the other in strictly accurate positions, and the assembly of this plate with the other sheet-metal elements of the projector need not be effected with great accuracy.

The accompanying drawings show, diagrammatically and by way of example, one embodiment of the projector object of the invention.

FIG. 4 is an elevational view of a transverse plate of the projector.

FIG. 5 is a horizontal section of a part of the mechanism of the projector.

FIG. 6 is a section on a larger scale of the hinge of the claw along line VI—VI of FIG. 4.

Figure 1:
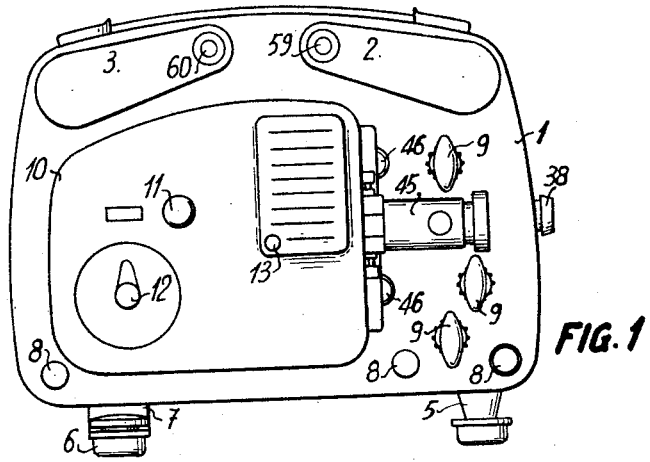
FIG. 1 is a side view of the projector as a whole.

Referring to FIG. 1, it will be seen that the projector comprises a sheet-metal longitudinal plate 1, parallel to the optical axis of the projector and carrying arms 2 and 3 which may be swung out in order to support the delivery and take-up spools. This plate 1 is provided with a folded edge 4 designed to give it stiffness, as shown in FIG. 3. This folded edge 4 forms a part of the outer wall, seen in FIG. 2.

Figure 9:
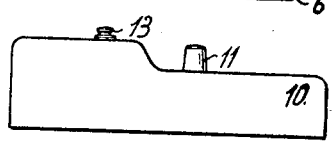
Figure 8:
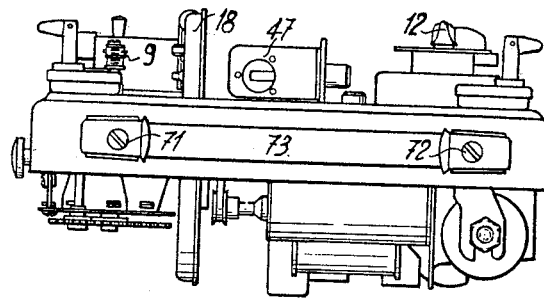
FIG. 8 shows the projector seen from above, after removal of the two lids shown in FIGS. 9 and 10.
Figure 10:
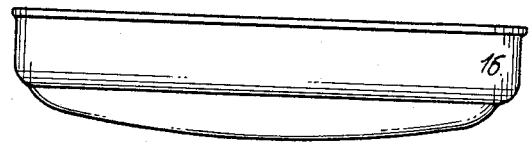

The plate 1 is provided, at its lower part, with a rest 5 in front and two rests 6 behind, which are connected by a transverse bar 7 fixed to the plate 1 and which are adjustable. The plate 1 also carries three rollers 8 and three sprocket-wheels 9 for guiding and feeding the film. A case 10 is fixed laterally to the plate 1 and protects a projection lamp, not shown, which may be reached by unscrewing the knob 11, the latter connecting the case 10 to the plate 1. FIG. 8 shows a socket 47 for securing the projection lamp. The case 10 also protects a control knob 12 the operation of which actuates suitable switch means for controlling the operation of the projector. The case 10 also carries a grooved element 13 (FIGS. 1 and 9) for retaining in position a lid 14. A movable knob 15 on the lid 14 actuates suitable means on the opposite or inner side of the lid for cooperation with the element 13 to retain the lid in the fixed position shown in FIGURE 2. The other face of the plate 1 is protected by a lid 16 fixed by means of a screw 17.

Referring more particularly to FIG. 3, it will be seen that the longituidnal plate 1 is joined rigidly to a transverse plate 18 by screws 19 and also to a second plate 20 parallel to the plate 1. The plates 1 and 20 may also be held in spaced-apart parallel relationship by braces 21 retained by screws 21a. The longitudinal plate 1 is higher than the transverse plate 18 and is provided with an opening 1a through which passes the transverse plate.

The assembly comprising the plates 1, 18 and 20 forms a rigid frame supporting the whole mechanism of the projector. A part of this assembly is shown in more detail in FIG. 5. The transverse plate 18 is of pressed sheet-metal and has a sunken central part 22 forming a housing 23 substantially rectangular, as shown in FIG. 4. A side 24 of this housing is designed to bear against the longitudinal plate 1, while the opposite side 25 bears against the plate 20. The sunken part 22 carries a bearing 26 for a longitudinal shaft 27 which passes through the plate 18 and carries a double cam 28 for driving a film feeding claw 29. This claw 29 is hinged at 30 to the transverse plate 18 and held in contact with the cam 28 by two springs 31 and 32. The claw 29 is provided at its end opposite to the hinge point 30 with projections disposed through an opening 39 for engaging the perforations in the film strip as is well known in the art. The spring 31 is hooked to a clamp 33 produced at the time of the stamping of the plate 18, while the spring 32 is hooked to a projection 34 secured to the latter.

FIG. 6 shows in detail the hinge of the claw 29 on the plate 18. A bearing screw 48 passes through a hole in the plate 18 and is tightened against the latter by a nut 49, a washer and a plate 50 being interposed. Two balls 51 and 52 are pressed between this plate 50 and the claw 29 as a result of the action of the spring 31 on the latter. These balls are disposed in two arcuate slots in the plate 18 and allow the claw to oscillate about an axis passing through its bearing points on these balls in order to effect the penetrating movements in the perforations of the film. The downward movements of the claw take place due to the rotation of the claw about the screw 48 on which it is hinged with the interposition of a sleeve 53 of synthetic resin. As is conventional, the end of the claw 29 projecting through the opening 39 transcribes more or less an orbital path during the advancement of the film through the apparatus. This movement is imparted by the rotation of the double cam 28, the peripheral cam surfaces of which are eccentrically disposed with respect to the shaft 27. As seen in FIGURES 4 and 5, the claw member passes between the two elements of the cam 28, and is provided with a transverse bearing plate 29a which is constantly urged upwardly against the periphery of the cam by the spring 32 to provide the vertical movement to the claw action. At the same time, the inclined face of one of the cam elements (FIG. 5) bears through the action of spring 31, against the side of the claw to provide the horizontal displacement of the claw, which displacement, combined with the aforementioned vertical movement, produces the usual orbital movement of the claw through the opening 39.

The shaft 27 is rotated by a motor and carries a pinion 35 with skew teeth gearing with a wheel 36 also with skew teeth, disposed above it and only a part of which has been shown in FIG. 5. The shaft 27 carries a second pinion 54 gearing with a wheel 55 (FIG. 7) disposed below the pinion 54. These two wheels are fixed to transverse shafts 37 and 56 for the drive of the sprocket-wheels 9. The two lowermost sprocket-wheels 9, 9, as shown in FIG. 1, are driven by the wheel 55 which is interconnected with the two toothed wheels 57 and 58. Movement of the wheel 55 turns wheel 57 which is mounted laterally thereof on a common shaft (not shown). Similarly, a common shaft connects the wheels 36 and 62 for driving the top sprocket wheel 9. Spindles 59 and 60 (FIG. 1) for driving the spools are carried by the arms 2 and 3 and are driven by gears, not shown, housed in these arms. The pivoting spindles of these arms constitute at the same time the driving splindles of the gears housed in these arms and each carries a pulley (not shown) housed in the case of the apparatus, for driving said gears and spindles. The pulleys, one of which is mounted on a shaft common with toothed wheel 63 are interconnected by means of a belt 61, so that rotation of the wheel 36 and the resultant movement of wheels 62 and 63 will drive both spindles 59 and 60.

Each arm 2 and 3 further includes a free wheel device designed to arrest the drive of one or the other of the spools according to the direction of running of the projector.

Figure 2:
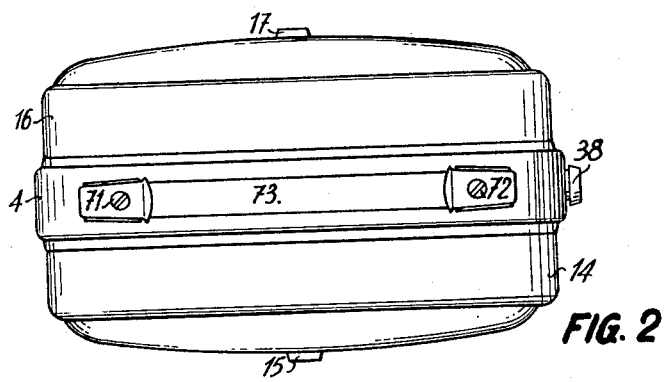
FIG. 2 is a view from above, the projector being closed by a lid.
Figure 3:
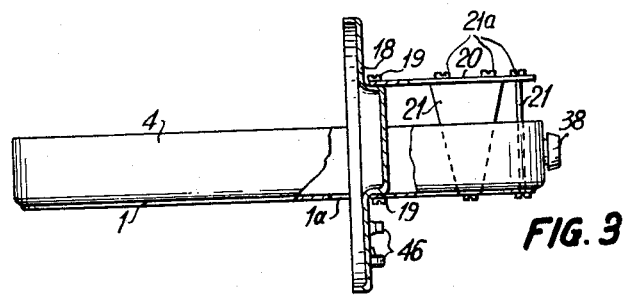
FIG. 3 is a plan view, partly in section, of the arrangement of the main sheet-metal elements constituting the projector.

The front end of the shaft 27 passes through the folded edge 4 of the longitudinal plate 1 and carries a knurled knob 38, visible in FIGS. 1 to 3, which permits of operating by hand the projector mechanism.

The plate 18 is provided with an opening 39 for the passage of the claw 29 and carries a plate 40 (FIG. 4) constituting the pressure shutter and subjected to the action of a U-shaped spring blade 41, this plate having an opening or film gate 42 for the luminous beam. The plate 18 further carries a spindle 43 on which is hinged a joint 44 carrying the objective lens 45.

Figure 7:
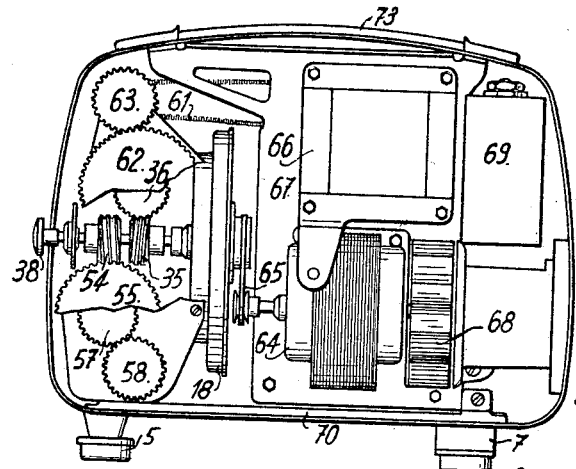
FIG. 7 is a side view of the inside of the projector, parts being broken away.

FIGS. 7 and 8 show the inside of the projector. An asynchronous motor 64 drives the shaft 27 by means of a belt 65. This motor is fed by a transformer 66 which is fixed together with the motor on a plate 67 extending parallel to the longitudinal plate 1 and contributing to the solidity of the frame of the apparatus. This motor 64 drives a fan 68 for cooling the projection lamp, and a condenser 69 is provided to ensure the dephasing of the monophase asynchronous motor 64.

The plate 67 is fixed at its lower part to a beam 70 on which are fixed the rest 5 and the bar 7 carrying the rests 6. This plate 67 is further integral with the upper part of the longitudinal plate by screws 71 and 72, ensuring at the same time the fixing of a handle 73. The plate 67 and the beam 70 form a chassis which is fixed to the folded edge 4 of the longitudinal plate 1 and which contributes to the solidity of the frame of the apparatus.

It will be seen that in the projector shown, all the parts the relative positions of which must be determined with great accuracy are fixed on the plate 18. It is thus possible to ensure a very accurate and steady mounting of the objective lens 45 relative to the claw 29 and to the film guiding means, which are constituted by four projections 46. The construction shown is also advantageous, because the whole motor mechanism is disposed on the same side of the longitudinal plate 1 and is protected by the lid 16 which is joined to the plate 1. This lid may easily be removed in order to reach all the parts of the mechanism.

I claim:

In a cinematographic projector, a sub-assembly including a vertically disposed longitudinal plate, parallel to the optical axis of the projector and provided with a vertical opening; a plurality of critically positioned elements including an objective lens; a film gate, a transverse shaft supporting sprocket and gear means for driving the picture film to and from said film gate, a driven actuating claw for feeding the film, a hinge for pivotally supporting said claw, a control cam driving said claw, a shaft carrying said cam and arranged longitudinally relatively to the optical axis of said projector, and means for supporting said critically positioned elements within said projector to permit removal thereof as an integral sub-assembly, said means including a transverse, vertical plate and having said cam carrying shaft journalled therethrough, a drive pinion on said cam carrying shaft, a parallel plate attached to said transverse plate and disposed parallel to said longitudinal plate when said transverse plate is disposed through said longitudinal plate, said film driving means journalled in said parallel and longitudinal plates and retained thereby in engagement with said pinion; and said objective lens, film gate, claw and hinge supported by said transverse plate with said claw adjacent the periphery of said cam.

References Cited in the file of this patent

UNITED STATES PATENTS

| | | |
|---|---|---|
| 1,274,607 | Schneider | Aug. 6, 1918 |
| 1,292,448 | Emory | Jan. 28, 1919 |
| 1,542,409 | Readeker | June 16, 1925 |
| 2,019,261 | Howell | Oct. 29, 1935 |
| 2,520,296 | Williams | Aug. 29, 1950 |
| 2,893,287 | Lunzer | July 7, 1959 |
| 2,907,532 | Briskin et al. | Oct. 6, 1959 |